(12) United States Patent
Bhardwaj et al.

(10) Patent No.: US 7,938,006 B2
(45) Date of Patent: May 10, 2011

(54) NON-CONTACT ULTRASOUND MATERIALS SYSTEMS AND MEASUREMENT TECHNIQUES

(76) Inventors: Mahesh C. Bhardwaj, State College, PA (US); Thomas J. Eischeid, State College, PA (US); Michael S. Biviano, State College, PA (US); Raghu S. Srivatsa, State College, PA (US); Neeraj S. Bhardwaj, State College, PA (US)

( * ) Notice: Subject to any disclaimer, the term of this patent is extended or adjusted under 35 U.S.C. 154(b) by 515 days.

(21) Appl. No.: 12/064,521

(22) PCT Filed: Aug. 24, 2006

(86) PCT No.: PCT/US2006/033046
§ 371 (c)(1),
(2), (4) Date: Aug. 15, 2006

(87) PCT Pub. No.: WO2007/025022
PCT Pub. Date: Mar. 1, 2007

(65) Prior Publication Data
US 2009/0199641 A1  Aug. 13, 2009

Related U.S. Application Data

(60) Provisional application No. 60/711,258, filed on Aug. 25, 2005.

(51) Int. Cl.
*G01H 5/00* (2006.01)

(52) U.S. Cl. ............................................. 73/597
(58) Field of Classification Search .................. 73/597
See application file for complete search history.

(56) References Cited

U.S. PATENT DOCUMENTS

| | | | |
|---|---|---|---|
| 6,522,415 B1 | 2/2003 | Magnussen |
| 6,763,281 B2 | 7/2004 | Schauer et al. |
| 7,082,833 B2 | 8/2006 | Heyman et al. |
| 7,107,851 B2 | 9/2006 | Owen |
| 7,112,173 B1 | 9/2006 | Kantorovich et al. |
| 7,112,961 B2 | 9/2006 | Lei et al. |
| 7,124,636 B2 | 10/2006 | Zheng et al. |

*Primary Examiner* — Hezron Williams
*Assistant Examiner* — Rodney T Frank
(74) *Attorney, Agent, or Firm* — The Webb Law Firm

(57) ABSTRACT

Apparatus for determining the speed of sound through a specimen comprises an ultrasound sending transducer, an ultrasound receiving transducer, a pair of laser distance sensors, a display device, a controller in communication with the ultrasound sending transducer, the ultrasound receiving transducer and the pair of laser distance sensors and the display device. The ultrasound sending transducer and one laser distance sensor are supported with a transducer surface in a first plane. The ultrasound receiving transducer and one last distance sensor are supported with a transducer surface in a second plane parallel with the first plane. A support for a specimen is provided between the first and second planes. The controller is programmed for gathering data from the ultrasound transducers and the laser distance sensors for calculating the speed of ultrasound in the specimen and displaying the results.

4 Claims, 6 Drawing Sheets

NON-CONTACT ULTRASOUND MATERIALS SYSTEMS AND MEASUREMENT TECHNIQUES

BACKGROUND OF THE INVENTION

The use of ultrasound for determination of physical properties, texture, and microstructure is well known. Specifically, it is also well known that ultrasound velocity of a material is directly proportional to its density and porosity. However, in order to determine ultrasound velocity in materials (material velocity) or other properties, the conventional ultrasound mode involves either direct or indirect contact of a transducer to the test material. For example, in order to efficiently transmit ultrasound in the test material, the transducer is physically coupled to the material by liquid couplants, dry contact couplants, or by submerging the material in liquids, generally water. Conventional ultrasonic coupling modes cannot be effectively applied to materials such as consolidated particles (green ceramics, powder metals, pharmaceutical tablets and other like materials), porous, early stage formation of polymers, and other materials that are sensitive to liquid couplants or any contact. Therefore, in order to ultrasonically analyze these materials, it is necessary to develop a new ultrasound mode that is free from any contact with the test media. The current invention is based upon very high efficiency Non-Contact Ultrasound (NCU) transducers, such as the one described in U.S. Pat. No. 6,311,573, entitled "Ultrasonic Transducer for High Transduction in Gases and Method for Non-contact Transmission in Solids," herein incorporated by reference in its entirety. This invention not only eliminates contact with the materials, but with careful analysis of ultrasonic signals in conjunction with appropriate electronic components, creates a functional mechanism for NCU velocity measurement, and thus its relationship with material density.

Kulkarni, et al. exhibit such relationships ("Ultrasonic Characterization of Green and Sintered Ceramics: I, Time Domain," Am. Cer. Soc., Cer. Bull, Vol. 73, No. 6, 1994) by utilizing dry coupling transducers and Bhardwaj ("Non-Contact Ultrasonic Characterization of Ceramics and Composites," Proceedings Am. Cer. Soc., V 89, 1998) and Carneim, et al. ("Non-Contact Ultrasonic Characterization of Green Bodies", Cer. Bull., April 1999) by utilizing NCU method, all of the foregoing of which are hereby incorporated by reference in their entirety.

The primary objective of this invention is to determine the test material ultrasound velocity (as well as to relate it to its density) without any contact of transducers or coupling liquids with the material. According to this invention ultimately, the only coupling medium for ultrasound transmission in test material is a gas, such as air, either under ambient or under high pressure environment.

SUMMARY OF THE INVENTION

Briefly, according to this invention, there is provided an apparatus for determining the speed of sound through a specimen comprising an ultrasound sending transducer, an ultrasound receiving transducer, a pair of laser distance sensors, a controller and a display device. The controller is in communication with the ultrasound sending transducer, the ultrasound receiving transducer and the pair of laser distance sensors, and the display device. The ultrasound sending transducer and one laser distance sensor are supported by a structure with a transducer surface in a first plane. The ultrasound receiving transducer and one laser distance sensor are supported by a structure with a transducer surface in a second plane parallel with the first plane. A structure is provided for supporting a specimen between the first and second planes. The controller is programmed for the following actions or calculations: a) causing an ultrasound sensor to determine the speed of sound in ambient air, b) causing the laser distance sensors to determine the distances from the first and second planes to the surfaces of the specimen, c) causing an ultrasound pulse to pass from the ultrasound transmitter through the specimen to the ultrasound receiver and recording the time for the pulse to travel from the first plane to the second plane, and d) calculating the speed of ultrasound in the specimen and displaying the results.

According to a preferred embodiment, the controller is programmed for causing the transmitting ultrasound sensor to transmit a pulse and recording the time to receive the pulse at the receiving ultrasound sensor when the specimen is not present to establish the speed of sound in ambient air.

According to the preferred embodiment, the distance between the first and second planes is adjustable and the controller is programmed to cause one of the laser distance sensors to determine the distance between the two planes.

According to a preferred embodiment, a specimen is supported between the first and second planes by an x-y positioning stage controlled by the controller enabling the generation of two-dimensional profiles of the speed through the specimen.

BRIEF DESCRIPTION OF THE DRAWINGS

Further features and other objects and advantages will become clear from the following detailed description made with reference to the drawings in which.

DESCRIPTION OF THE PREFERRED EMBODIMENTS

Technique #1

Figure 1:
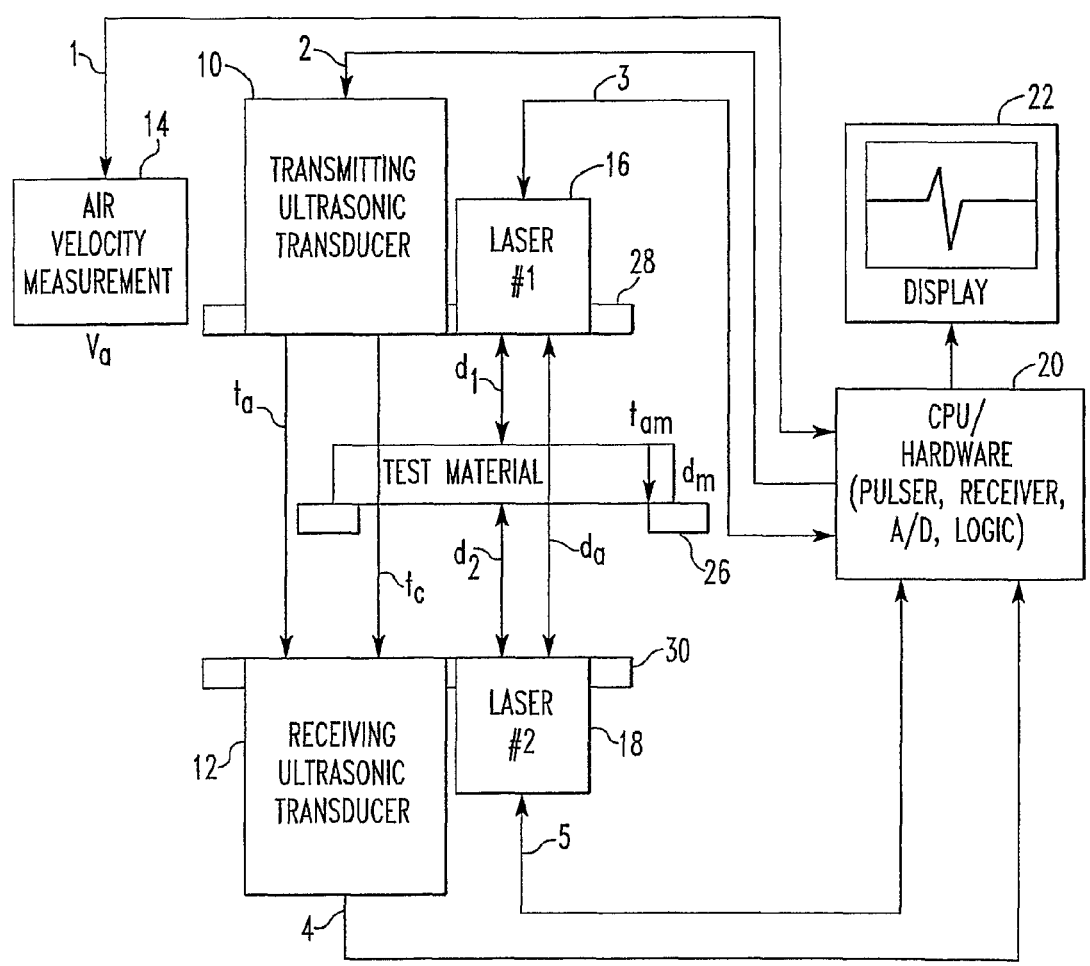
FIG. 1 is a schematic for hardware layout and required measurements for one preferred embodiment of this invention.

Determination of Material Ultrasound Velocity by Automatic Measurement of its Thickness and Ultrasound Time-of-Flight (TOF) Through it A schematic shown in FIG. 1 depicts hardware for this technique, which includes: a transmitting and receiving pair of ultrasonic transducers 10, 12, an additional ultrasonic transducer 14 operating in pulse-echo mode, a pair of laser distance sensors, and controller 20 and display 22. A support 28 holds the transmitting ultrasound transducer and one laser distance sensor in a first plane. A support 30 holds the receiving ultrasound transducer and the other laser distance sensor in a second plane. A support 26 is provided for positioning the specimen between the first and second planes. The controller may be provided with internally integrated or an external transmitting transducer excitation mechanism, such as a pulser, receiving transducer amplification mechanism, such as a receiver amplifier, analog-to-digital converter, and logic unit with software. The controller is typically a programmed microcontroller which includes a CPU. The controller is in communication with the ultrasonic transducers 10, 12, and 14 by leads 1, 2, and 4, respectively. The controller is in communication with the laser distance sensors by leads 3 and 5.

The laser distance sensors are commercial products, for example, those available from Omron Electronics LLC, One Commerce Drive, Shaumburg, Ill. 60173. The laser distance sensors output an analog signal proportional to the distance to the surface being sensed. The applicants have used the Omron model ZX-LD40 sensor which has a sensing distance of 40 plus or minus 10 mm and a resolution of 2 microns.

FIG. 1 also illustrates what measurements are necessary to calculate the material ultrasound velocity, which are described as follows:

$V_a$: Velocity as calculated by measuring the time required for an ultrasonic signal to travel a known distance within the sensor itself.

$t_a$: Time of Flight (TOF) as measured from transmitting ultrasonic sensor to receiving ultrasonic sensor through air column.

$t_c$: TOF as measured from transmitting ultrasonic transducer to receiving ultrasonic sensor through air and test material.

$d_1$: Distance measured from laser distance sensor #1 to test material and back.

$d_2$: Distance measured from laser distance sensor #2 to test material and back.

$d_a$: Distance between laser distance sensors as well as ultrasonic sensors.

$d_m$: Thickness of test material as measured by the outputs from laser distance sensors #1 ($d_1$) and #2 ($d_2$).

$t_{am}$: TOF in air corresponding to that of the thickness of the test material.

$\rho_m$: Material density derived from correlating acoustic measurements on control samples of test materials.

Referring to FIG. 1, the functions of the hardware set forth are as follows:

1. In order to measure the velocity of air, a separate ultrasonic transducer is operated in pulse-echo mode. The time required for the ultrasonic signal to travel a known distance within the ultrasonic sensor itself is recorded by the CPU. This time and distance is then used to calculate the velocity of air at that given point in time, taking into account all environmental conditions. This is used to calculate $V_a$.

2. The transmitting ultrasonic transducer must receive an excitation voltage either from an internally mounted pulser within the CPU or by an external source of transducer excitation. Either way, the time at which each pulse is emitted can be recorded by the CPU.

3. Laser distance sensor #1 outputs a DC analog voltage to the CPU. This voltage is a measurement of time required to travel from laser distance sensor #1 to the surface of the test material and back, and corresponds to the distance from the test material to both the transmitting ultrasonic sensor and distance sensor #1. This will be used with the output of laser distance sensor #2 for the CPU to calculate the thickness of the test material at specified intervals, otherwise known as $d_m$.

4. A second ultrasonic sensor is needed when operating in the transmission mode. This receiving transducer is capable of receiving the pulsed signal from the transmitting sensor through air alone ($t_a$) as well as through the test material and air ($t_c$). The received signal is fed into a receiver which can be internally mounted within the CPU, or as a separate receiver amplifier. The received signal then enters the logic unit of the CPU after it travels through an analog-to-digital converter. The signal strength and elapsed time from transmitting sensor pulse to receiver are both recorded by the CPU, and all time measurements are calculated. These time calculations account for $t_a$, $t_c$, and $t_{am}$.

5. As mentioned above, distance sensor #2 works in conjunction with laser distance sensor #1 to calculate the thickness of the test material. Laser distance sensor #2 also outputs its distance measurement through a DC analog voltage that is interpreted by the CPU logic unit. This is also used to calculate $d_m$.

Procedure and sequence of calculations leading to ultrasound velocity measurement in test material First, the air velocity measurement transducer, operating in pulse-echo mode, is used to determine the velocity of ultrasound in air under test conditions.

Next, the time required for an ultrasonic signal to pass from the transmitting ultrasonic transducer to the receiving ultrasonic sensor is calculated by the logic unit within the CPU.

The test material is then brought between the ultrasonic transducer pair. During this time, the TOF through the air and test material is calculated by the logic unit of the CPU.

Laser distance sensors #1 and #2 are also used at this time to calculate the thickness of the test material. To measure distances, the laser distance sensors will record the amount of time required to receive a reflected signal after a short laser burst has been emitted. Knowing the velocity at which light travels in air, the unknown distances can then be calculated.

The CPU now has all measurements and information needed to accurately calculate the velocity of ultrasound through the test material. Calculations of these measurements are listed below:

$$d_m = \frac{(d_a - d_1 - d_2)}{2}$$

Equation 1: Calculation of $d_m$.

$$t_{am} = \frac{d_m}{V_a}$$

Equation 2: Calculation of $t_{am}$.

$$V_m = \frac{d_m}{t_{am} - (t_a - t_c)}$$

Equation 3: Calculation for determining the velocity through a test material with technique #1.

Figure 2:
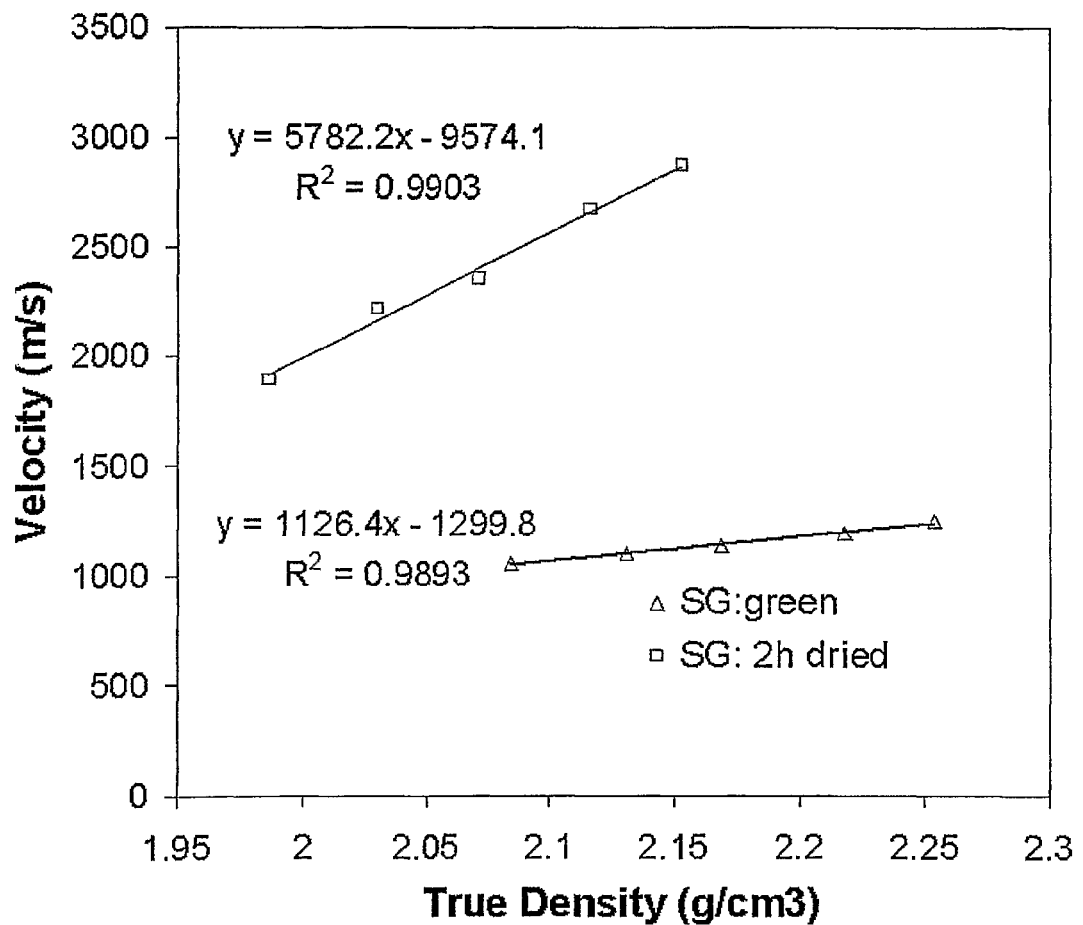
FIG. 2 is a graph illustrating the relationship between NCU velocity according to the embodiment described with reference to FIG. 1 with density of green ceramics as a function of green/wet and dry states.

If a velocity or density image of a test material is desired, each measurement is repeated at each point determined by the desired resolution of the user. By applying this technique, FIG. 2 demonstrates the relationship between NCU velocity and density of green ceramics.

Technique #2

Determination of Material Ultrasound Velocity Equivalent by Automatic Measurement of its Thickness and its Equivalent Ultrasound Time of Flight (TOF)

Figure 3:
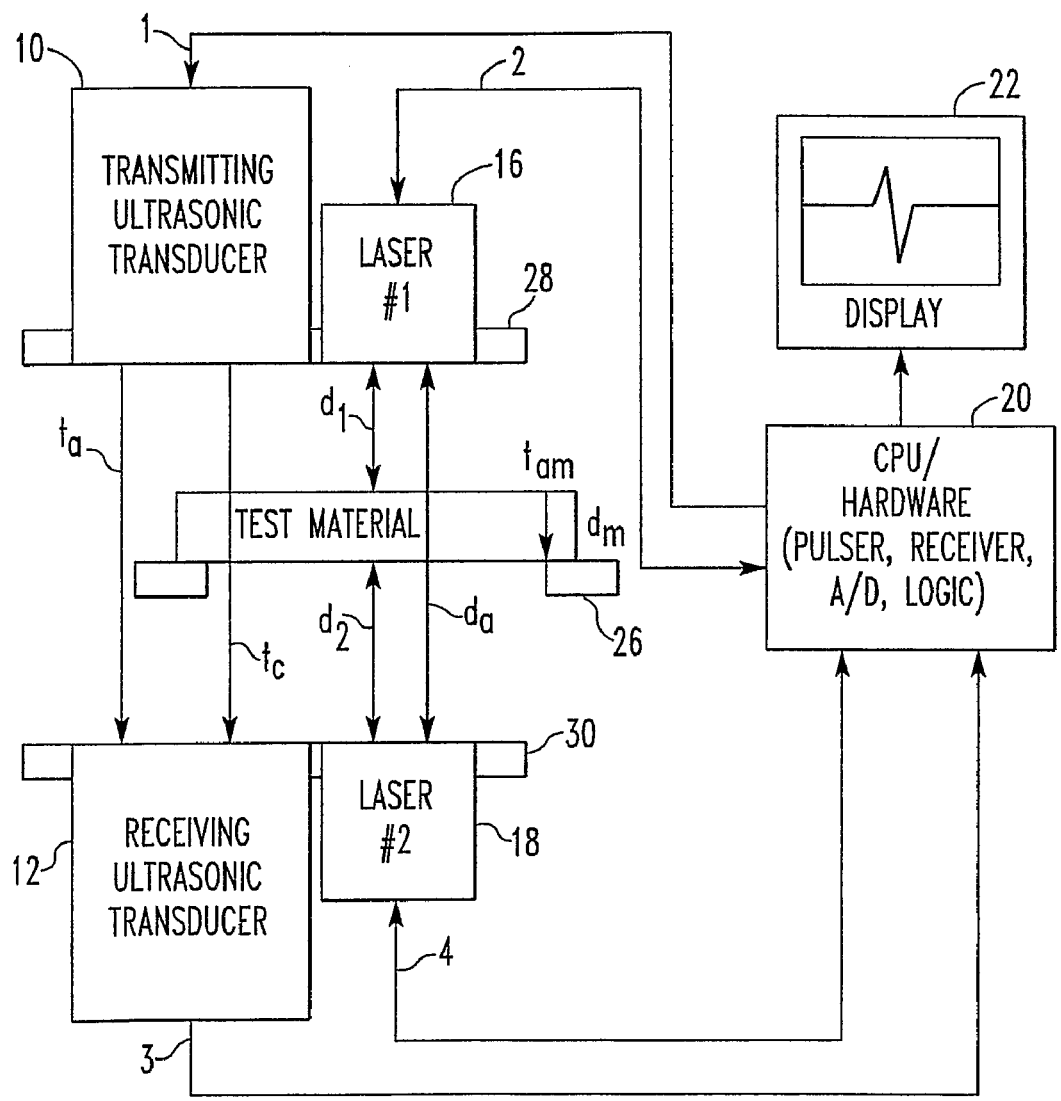
FIG. 3 is a schematic of hardware layout and required measurements for another preferred embodiment.

A schematic shown in FIG. 3 depicts hardware for this technique. The hardware list includes: transmitting and receiving pair of ultrasonic transducers 10, 12, pair of laser distance sensors 16, 18, and controller (CPU) 20 and display 22. Support 28 holds the transmitting ultrasound transducer and one laser distance sensor in a first plane. Support 30 holds the receiving ultrasound transducer and the other laser distance sensor in a second plane. Support 26 is provided for positioning the specimen between the first and second planes. The controller is provided with internally integrated or externally mounted pulser, receiver amplifier, analog-to-digital converter, information display, and logic unit with software. It should be noted that in this technique there is no need for an ultrasound velocity measurement transducer. The controller is in communication with the ultrasonic transducers 10, 12 by leads 1 and 3, and with the laser distance sensors by leads 2 and 4. FIG. 3 also illustrates what measurements are necessary to calculate the material ultrasound velocity equivalent, which are described as follows:

$t_a$: TOF as measured from transmitting ultrasonic sensor to receiving ultrasonic sensor strictly through air.

$t_c$: TOF as measured from transmitting ultrasonic sensor to receiving ultrasonic sensor through air and test material.

$d_1$: Distance measured from laser distance sensor #1 to test material and back.

$d_2$: Distance measured from laser distance sensor #2 to test material and back.

$d_a$: Distance between laser distance sensors as well as ultrasonic sensors.

$d_m$: Thickness of test material as measured by the outputs from laser distance sensors #1 ($d_1$) and #2 ($d_2$).

$\rho_m$: Material density derived from correlating acoustic measurements on control samples of test materials $V_x$: Combination velocity of air and test material, identified as material ultrasound velocity equivalent.

$\delta_t$: Equivalent TOF in test material, i.e., TOF difference between TOF in air and TOF in air plus test material.

Referring to FIG. 3 the functions of the apparatus set forth are as follows.

1. The transmitting ultrasonic transducer must receive an excitation voltage either from an internally mounted pulser within the CPU, or possibly in an external box. Either way, the time at which each pulse is emitted can be recorded by the CPU.

2. Laser distance sensor #1 outputs a DC analog voltage to the CPU. This voltage is a measurement of time required to travel from laser distance sensor #1 to the surface of the test material and back, and corresponds to the distance from the test material to both the transmitting ultrasonic sensor and laser distance sensor #1. This will be used with the output of laser distance sensor #2 for the CPU to calculate the thickness of the test material at specified intervals, otherwise known as $d_m$.

3. A second ultrasonic sensor is needed when operating in the transmission mode. This receiving transducer is capable of receiving the pulsed signal from the transmitting sensor through air alone ($t_a$) as well as through the test material and air ($t_c$). The received signal is fed into a receiver which can be internally mounted within the CPU, or as a separate piece of hardware. The received signal then enters the logic unit of the CPU after it travels through an analog-to-digital converter. The signal strength and elapsed time from transmitting sensor pulse to receiver are both recorded by the CPU, and all time measurements are calculated. These time calculations are used for $t_a$ and $t_c$.

4. As mentioned above, laser distance sensor #2 works in conjunction with laser distance sensor #1 to calculate the thickness of the test material. Laser distance sensor #2 also outputs its distance measurement through a DC analog voltage that is interpreted by the CPU logic unit. This is also used to calculate $d_m$.

Procedure and sequence of calculations leading to ultrasound velocity in test material:

1.) First, the time required for an ultrasonic signal to pass from the transmitting ultrasonic sensor to the receiving ultrasonic sensor is calculated by the logic unit within the CPU.

2.) The test material is then brought between the ultrasonic transducer pair. During this time, the TOF through the air and test material is calculated by the logic unit.

3.) Laser distance sensors #1 and #2 are also used at this time to calculate the thickness of the test material. The CPU now has all measurements and information needed to accurately determine a correlation between the velocity of sound through the test material and density. Calculations of these measurements are listed below in Equations 4-5, respectively:

$$\delta = t_a - t_c$$

Equation 4: Calculation of δt $$V_x = \frac{d_m}{\delta t}$$

Equation 5: Calculation of $V_x$

Given that $V_x \propto V_m$ and that $V_m \propto \rho_m$
It is also true that $V_x \propto \rho_m$
Therefore:

$$\rho_m \propto \frac{d_m}{\delta t}$$

Figure 4:
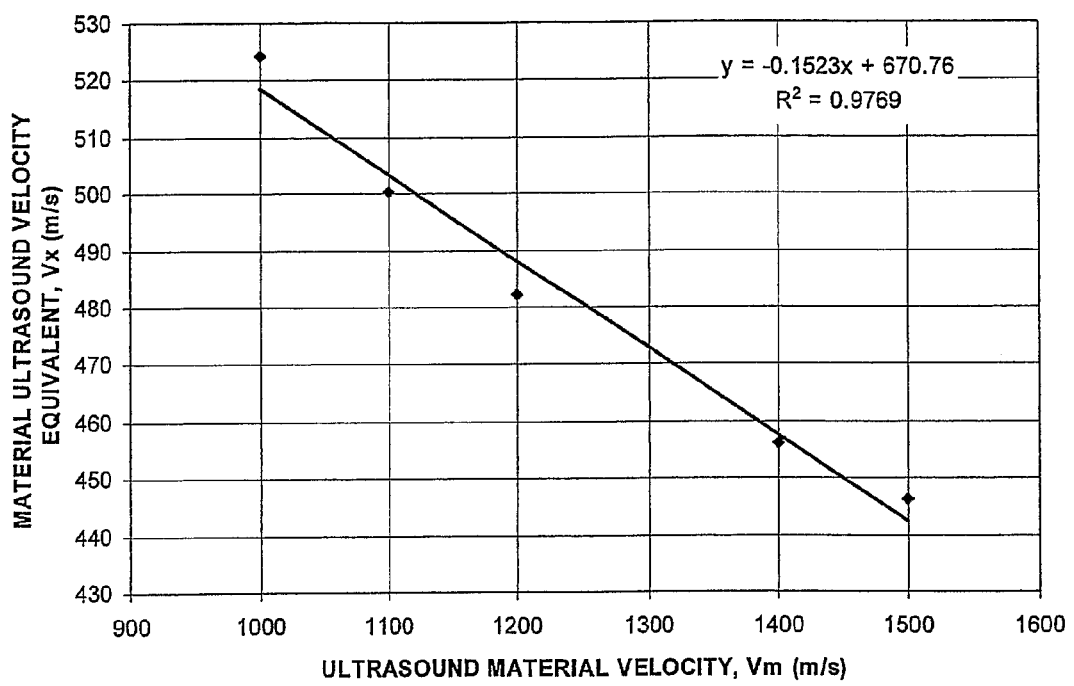
FIG. 4 is a graph showing the relationship between velocity equivalent, $V_x$, and true material velocity, $V_m$.

The techniques described herein have been successfully demonstrated to meet the tasks of this invention as demonstrated in FIG. 4, which shows a direct relationship between material velocity equivalent, $V_x$, with true material velocity, $V_m$.

Although the techniques described above are suitable for material ultrasound velocity measurements, they can also be applied for the measurement of absolute or quasi-absolute ultrasound transmittance in the material, such as the one described by Bhardwaj in "Non-Destructive Evaluation: Introduction of Non-Contact Ultrasound," Encyclopedia of Smart Materials, ed. M. Schwartz, John Wiley & Sons, New York, 690-714 (2002).

Figure 5:
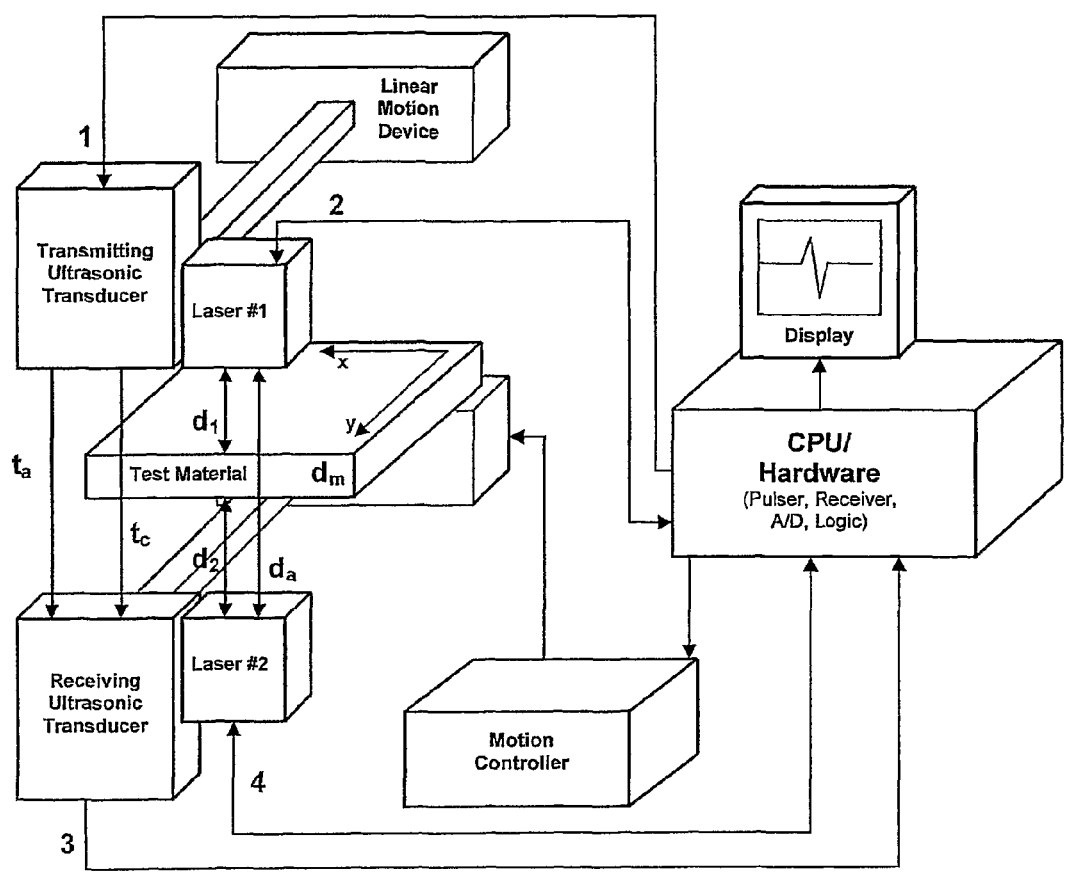
FIG. 5 is a schematic of single channel raster C-scanning showing x-y transducer translation with a linear motion device in conjunction with other hardware necessary for NCU material velocity measurements.
Figure 6:
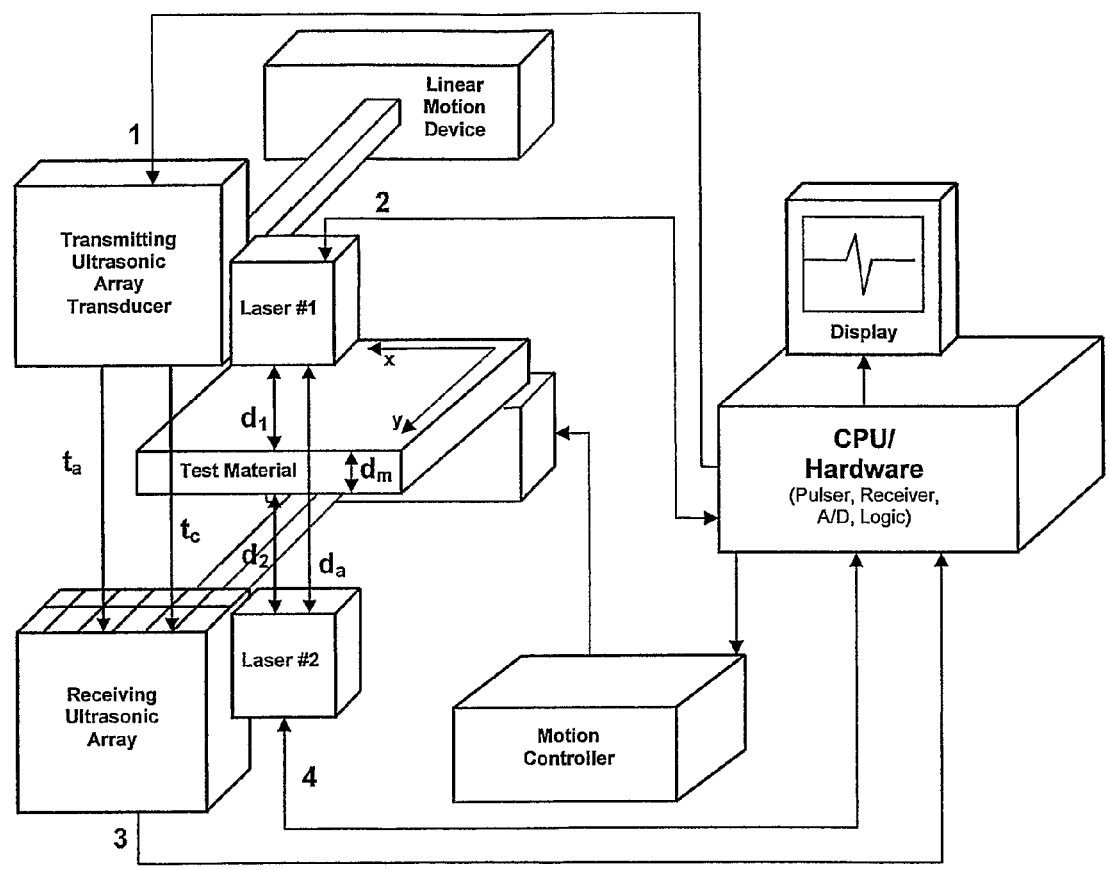
FIG. 6 is a schematic of multi-channel linear or matrix array scanning/imaging showing x-y transducer translation with a linear motion device in conjunction with other hardware necessary for NCU material velocity measurements.

By suitable transducer scanning mechanism, it is possible to measure and plot ultrasound material velocity, TOF, and/or its density; or its transmittance to produce image C-scan images by single-channel or by multi-channel arrays. FIGS. 5 and 6 respectively show schematics for single-channel raster C-scanning and multi-channel linear or matrix array imaging. In each case, the specimen is supported by an x-y positioning stage controlled by the controller.

Having thus described our invention with the detail and particularity required by the Patent Laws, what is desired protected by Letters Patent is set forth in the following claims.

The invention claimed is:

1. Apparatus for determining the speed of sound through a specimen comprising:
    an ultrasound sending transducer,
    an ultrasound receiving transducer,
    a pair of laser distance sensors,
    a display device,
    a controller in communication with the ultrasound sending transducer, the ultrasound receiving transducer and the pair of laser distance sensors and the display device,
    the ultrasound sending transducer and one laser distance sensor being supported with a transducer surface in a first plane,
    the ultrasound receiving transducer and one laser distance sensor being supported with a transducer surface in a second plane parallel with the first plane,
    means for supporting a specimen between the first and second planes, said controller being programmed for causing an ultrasound sensor to determine the speed of sound in ambient conditions,
    for causing the pair of laser distance sensors to determine the distance from the first and second planes to the surface of the specimen and for calculating the thickness of the specimen,
    for causing an ultrasound pulse to pass from the ultrasound transmitter through the specimen to the ultrasound receiver and recording the time for the pulse to travel from the first plane to the second plane, and
    for calculating the speed of ultrasound in the specimen and displaying the results.

2. The apparatus according to claim 1, wherein the controller is programmed for causing the transmitting ultrasound sensor to transmit a pulse and recording the time to receive the pulse at the receiving ultrasound sensor and with the distance between the first and second planes determine the laser distance sensor to establish the speed of sound in ambient conditions.

3. The apparatus according to claim 1, wherein the controller is programmed for causing the transmitting ultrasound sensor to operate in the pulse echo mode to determine the speed of sound in ambient conditions.

4. The apparatus according to claim 1, wherein the means for supporting a specimen between the first and second planes comprises an x-y positioning stage controlled by said controller enabling the generation of two-dimensional profiles of the speed through the specimen.

\* \* \* \* \*